United States Patent [19]

Reifsnyder et al.

[11] Patent Number: 4,804,297

[45] Date of Patent: Feb. 14, 1989

[54] METHOD OF UNDERWATER CASTING

[75] Inventors: Richard H. Reifsnyder, Ardmore; Robert W. Spencer, Wallingford, both of Pa.; Robert A. Brennan, Trenton, N.J.

[73] Assignee: PQ Corporation, Valley Forge, Pa.

[21] Appl. No.: 105,855

[22] Filed: Oct. 8, 1987

[51] Int. Cl.$^4$ .............................................. E02D 15/06
[52] U.S. Cl. .................................. 405/222; 405/195; 405/267; 166/292
[58] Field of Search ............... 405/223, 233, 263, 266, 405/267, 222; 166/292

[56] References Cited

U.S. PATENT DOCUMENTS

| | | | |
|---|---|---|---|
| 4,014,174 | 3/1977 | Mondshine | 405/233 |
| 4,199,279 | 4/1980 | Himeji et al. | 405/233 X |
| 4,621,692 | 11/1986 | Mondshine | 166/292 X |
| 4,643,254 | 2/1987 | Barbosa et al. | 166/292 X |
| 4,662,448 | 5/1987 | Ashford et al. | 166/292 X |
| 4,676,318 | 6/1987 | Myers et al. | 166/292 X |

*Primary Examiner*—Dennis L. Taylor
*Attorney, Agent, or Firm*—Ernest G. Posner; J. Stephen Bobb; Fred C. Philpitt

[57] ABSTRACT

A method of formless underwater casting of cement is disclosed. The method involves the addition of silicate to water in which a structure bound with Portland cement or high-alumina cement is to be cast. The cementitious mixture as a slurry is then poured into the water to form a structure. The silicate and cementitious mixture can be placed in the water at the same time using concentric nozzle systems.

7 Claims, No Drawings

METHOD OF UNDERWATER CASTING

FIELD OF THE INVENTION

This invention relates to a method for underwater casting of cement. More particularly the method described in this invention involves the use of silicate solutions to condition the water into which the cement is cast in order to control set times, greatly increase acid resistance and provide self supporting qualities. Self supporting qualities allow formless casting.

DESCRIPTION OF THE PRIOR ART

There are many situations in which there is a need to place a cementitious mixture under water easily and have it set quickly and reliably. Such a need is apparent in the casting of underwater foundations, abutments and piers, the filling of flooded abandoned mine tunnels, and the repair of water-carrying concrete conduits. Often forms must be built, and the water removed with difficulty before the principal task of placing the cement can begin. Removal of forms, if required, is an additional difficulty.

Abandoned mine tunnels and shafts present two somewhat related problems. If the roofs of the stopes or tunnels, flooded or dry, are not properly supported, the overburden may subside, causing considerable damage to surface property. When the stopes were formed the roofs were supported either by leaving columns of unmined material or by constructing artificial supports. With the passage of time these columns, whether self supporting or artificially constructed, can fail. Subsidence often occurs years after the mine has been abandoned, and the necessary remedial action is taken by government agencies to protect the citizens living on the surface and their property.

Secondly, the passage of oxygen through the unsealed portions of the mine oxidizes exposed minerals, especially sulfur. Water percolating through the mine dissolves these oxidized minerals. The dissolved minerals, in turn, acidify the water, creating an environmental problem when the water escapes the mine. Thus a permanent seal is desired to prevent water from leaving the mine and acidifying local streams and groundwater, causing permanent damage to flora and fauna. The seal needs to be impervious to oxygen so that further oxidation of exposed minerals does not take place. Additionally, the seal needs to be acid resistant for long term control.

The literature has many examples of cementitious compositions which include various additives in an effort to impart improved properties to the final cement. Alkali metal silicate solids and solutions have been used for many years, either singly or as part of an additive complex, in cementitious slurries for this purpose.

Diamond (U.S. Pat. No. 2,878,123) uses solid water-soluble silicates as a component of an additive to a cement slurry. The added soluble silicate binds the free water as it is liberated from the cementitious mixture during setting, thus controlling shrinkage. Diamond's composition (U.S. Pat. No. 2,336,723) enables the use of available seawater to form the initial cementitious slurry. Again he uses soluble silicates as part of his additive to the original cement mix.

Hall, et al. (U.S. Pat. No. 4,402,749) use sodium silicate with other additives to impart early high strength and as an aid in controlling setting rate. The silicate is added to the original cementitious mixture.

Paramore, et al. (U.S. Pat. No. 3,672,173) emplace a cementitious mixture on mine tunnel walls and floors to form an impermeable barrier to the passage of water. The emplaced mixture is formed of nearly equal parts of Portland cement slurry and a silicate-containing mixture, which are stored in separate tanks and are mixed in their spraying apparatus just prior to issuing from the spray nozzle. Thus, the emplaced mixture contains silicate uniformly distributed throughout the mass. Their method is directed to forming plugs in relatively dry openings to prevent later seepage of mine water into the above-ground environment. Though their method is formless and relies on the quick set of the plug, they do not deal with casting a plug or barrier into an aqueous environment. The water of their cementitious mixture is entirely foreign, that is, it is brought to the emplacement site as part of the emplaced mixtures. Also, the silicate is already an intimate part of their emplaced mixture.

Alkali solutions added to the cementitious mixture before pouring cause an immediate increase in slurry viscosity and a concomitant stiffness and decrease in set time. However, this is a "false set" and, with time, the mixture slumps, losing its shape. Therefore, the addition of silicate to the cementitious mixture as described in the prior art does not allow formless casting, particularly under water.

These teachings use alkali metal silicate solids or solutions in differing amounts as part of additives to their cementitious slurries before those slurries are emplaced. Except for Paramore, et al. no one teaches a formless method, and Paramore's method does not include underwater casting. In contradistinction it is an object of our invention to first place silicate solution into at least a portion of a body of water, and then place the cementitious mixture in the same volume of water that has been conditioned with silicate. This gives the resultant cement the desired enhanced properties.

Currently, in the filling of abandoned mine tunnels a retaining bulkhead is built, the water is pumped out and discharged to the environment, roofs and sides shored up if need be, a second bulkhead built, and then the cementitious mixture is pumped into the relatively dry space. This site preparation is often difficult to do and, if the tunnel or stope is unstable, hazardous as well. In some instances it is impossible to keep the space free of water for the time required for the construction of the second bulkhead and the pouring of the cement. Our method circumvents such hazardous site preparation and obviates the necessity of water removal and its environmentally safe disposal.

It is a further objective of this invention to place and set a cementitious mixture under water, with quick setting, high viscosity and self-supporting properties. Ideally, such a method should be economical, allowing for mininum and inexpensive site preparation and using inexpensive and easily handled materials that pose no environmental threat, that are not hazardous to the health of the handlers, and that will produce the desired result in a relatively short time. Our method uses well known and Generally Recognized as Safe (GRAS) materials, and requires little site preparation. Calculations comparing the volume of material to build a six-foot support pile with and without our use of silicate show a factor of 13 times less material is required using our method. This results in significantly less material costs as well as handling and manpower costs involved with emplacement.

SUMMARY OF THE INVENTION

The broad and principal object of this invention is to provide a safe method of underwater casting of cementitious mixtures. The process involves the conditioning of the water with alkali silicate solutions and, depending on the salt content of the water, other additives as required. The silicate solution is laid down in the water so that its intrusion volume infiltrates at least the final volume to be filled by the cementitious mixture. After the silicate has been added, the cementitious mixture is placed in the same or a smaller volume of water which has been conditioned by the silicate solution. This conditioning can also be accomplished by using a dual delivery method: the silicate is delivered in a sheath around the cementitious mixture. The mixture itself may be either Type I or Type II Portland cement containing varying amounts of fly ash or pozzolans and other additives.

More specifically, this invention will provide a means of supporting flooded abandoned mine tunnels to prevent subsidence of the overburden and thus alleviate the menace these tunnels pose for the surface and its structures. Supporting and plugging of these tunnels is possible by drilling shafts to the area and then piping the silicate and the cementitious mixture simultaneously or sequentially.

Additionally, this invention will provide an easy and inexpensive method of casting piers, retaining walls and other underwater foundations.

THE INVENTION

The process of our invention resides in treating water with a silicate solution prior to casting a cementitious mixture in the volume occupied by the water. In general, alkali metal silicate solutions are used to treat the water prior to casting the cement. These well-known materials of commerce are usually formed by dissolving the appropriate silicate glass in water. Such glasses are prepared by the fusion of an alkali metal carbonate with a silica source. Silicate solutions that have 1.6 to 4 moles of $SiO_2$ for each mole of $M_2O$ and contain 25 to 35% silica are useful in the method of our invention. M represents sodium, potassium or mixtures thereof. We prefer to use sodium silicate solutions that contain 2.5 to 4.0 moles of $SiO_2$ per mole of $Na_2O$. We most prefer 2.8 to 3.9 moles of $SiO_2$ for each mole of $Na_2O$. Such solutions can also be prepared by dissolving silica in caustic. Organic ammonium silicates of similar composition can also be used. These materials are also articles of commerce and the preparation of such materials is described in U.S. Pat. No. 3,301,853 among others.

The cement used in the process of our invention is a common article of commerce and is called Portland cement. The more recently developed high-alumina cements can also be used in the process of our invention. In general, such cements are prepared by sintering sources of calcium, aluminum and silicon to form various silicates, which upon exposure to water, hydrate to form solid structures. In the U.S., Portland cement is classified in five types designated by the ASTM specification C150-76. We prefer to use Portland cement types I and II.

In general use and in the process of our invention, cement is combined with various inert materials such as stone, gravel, fly ash and the like to provide the cementitious mixture required. We prefer to use fly ash in our cementitious mixtures.

The process of our invention is carried out by adding a silicate solution in at least a portion of a body of water. Then the cementitious mixture is slurried with water and placed in that portion of the body of water conditioned by silicate. The mixture would ideally form a column, but actually forms a cone of material in the water.

The silicate can be placed in the water and allowed to diffuse into it. A more desirable and more efficient manner of placing the silicate and cementitious mixture involves forming flows of the silicate and cementitious mixture. The silicate flow surrounds the flow of the mixture. Concentric nozzles are effective in forming such flows.

Sufficient silicate must be added by either embodiment of our method to provide the essentially green or unset cementitious mixture with the self-supporting characteristic required to rapidly build a column- or cone-like structure that is at least partially submerged in a body of water. We define "self-supporting" as meaning that without a form the cementitous mixture does not spread to cover the total area that is water covered and that a column or cone can be built that does not sag or collapse under the addition of more cementitious slurry. In general, the desired self-supporting qualities can be included by adding sufficient silicate to provide less than about 3% wt/wt of silicate solids. If the structure need not be too high about 0.5% silicate solids can be effective. We prefer to use 1 to 3% silicate added to the water prior to pouring the cementitious slurry. When flows of the cementitious slurry and silicate solution are used, the silicate is used at 25 to 45% solids, and 2.5 to 15 parts by volume (pbv) of the cementitious mixture is used for each pbv of the silicate solution. We prefer to use 3 to 10 pbv of the cementitious mixture as a slurry for each pbv of silicate.

Another variable that is important in forming the structures we desire is the amount of water that is combined with the cementitious solids mixture to produce the cementitious mixture slurry that is placed in the body of water. Sufficient water must be added to provide hydration and setting and to allow handling of the slurry such as pumping or pouring. If too much water is added the green structure may not be self-supporting. We prefer to use 0.2 to 1 pbw of water for each pbw of cementitious mixture.

A more detailed description and fuller understanding of our process can be obtained from the following illustrative examples.

EXAMPLES

The following examples illustrate certain embodiments of our invention. These examples are not provided to establish the scope of the invention, which is described in the disclosure and recited in the claims. The proportions are in parts by weight (pbw), percent by weight (% wt/wt) or parts by volume (pbv) unless otherwise indicated.

EXAMPLE 1

To check acid resistance, two cement formulations were prepared using an 8:1 (by weight) ratio of fly ash to Portland cement Type I. To the first formulation 2.5% (by total weight of the mixture) silicate solution (PQ Corporation's type "N" sodium silicate, $SiO_2/Na_2O=3.2$, by weight 38% solids and baume $=41°$)

was added before injection into ordinary tap water. No silicate was added to the second cement formulation; however, 0.5% by weight of silicate solution was added to the tap water before the cement was injected. Both samples were allowed to set in ordinary tap water for one week. The water was then poured off and replaced with an aqueous solution of sulfuric acid of pH 1.0. After one week's observation the sample set in ordinary tap water which had a small amount of alkali silicate solution added to it before the injection of the cement showed no signs of degradation or weakening. The other sample, even though the injected mixture contained in it five times more silicate, displayed signs of degradation and loss of surface hardness. The cement sample that contained the 0.5% silicate illustrates certain aspects of the prior art and shows the cement to be attacked by acid. The cement sample prepared by our process is more acid resistant.

EXAMPLE 2

The following cementitious mixture was formulated: five parts by weight of fly ash was added to one part by weight of a cement containing equal portions of Portland Type I and Type II cement. Then 550 grams of this dry mix was added to 200 grams of water. Two identical tanks of approximately 13-liter capacity were filled with ordinary tap water and a plank placed in the bottom of each tank inclined at a 15° angle to the bottom and with one end of the plank resting on the bottom of the tank. Sufficient sodium silicate was added to Tank A to form a 1% solution of the silicate in that tank. No silicate was added to Tank B. A peristaltic pump with a 15 head, capable of delivering 100 milliliters per minute of material was used to transfer material to either tank. The delivery tube of ordinary laboratory Tygon ™ tubing was placed into Tank B at approximately the midpoint of the inclined plane formed by the plank and the cementitious slurry formed above transferred into the tank until the slurry encompassed approximately ½ of the tank. A sediment cloud formed immediately on the introduction of the cementitious mixture. The same mixture was injected into Tank A in the same manner. No sediment cloud formed on the introduction of the cementitious mixture to the tank containing water pretreated with silicate.

EXAMPLE 3

The cementitious mixture of Example 2 was used in this test. The tanks were prepared as described in Example 2. Clean delivery lines were used. Approximately the same volume of material as in Example 2 was injected from above the surface of the water. Tank B again contained only ordinary tap water; Tank A contained a 1% solution of sodium silicate. A much larger cloud of sediment wa formed when the cementitious mixture was injected into Tank B than when injected into Tank A. When Tank B was stirred some material separated from the pile. Stirring Tank A only activated the loose material which had separated on the initial injection. Both tanks were observed after 90 minutes. In Tank A the ribbons formed as a result of injection from a narrow tube were sharply delineated and the water around the pile was clear. In Tank B the ribbon forms had broken down leaving a smooth surface on the pile of material; the water around the pile was cloudy with suspended particles. The pile in Tank A stayed intact. The pile in Tank B was in the process of breaking down. A blade penetrated the pile of Tank A much more easily than it penetrated the pile in Tank B. These results show the self-supporting nature of the cementitious mixture and that formless casting can be accomplished.

EXAMPLE 4

The tanks were prepared as described in Example 2. The dry cementitious mixture was formulated similarly; in this example water was added to the dry mixture to make 50% water by weight in the final cementitious mixture. The injection pipe was started at approximately the midpoint of the plank near the plank's surface and lifted up to the surface of the water while the cementitious mixture was injected. The material deposited in Tank B showed a low angle of repose; on injection the water became cloudy instantly. The material in Tank A formed a high angle of repose and the water cleared after injection.

EXAMPLE 5

The tanks were prepared as in Example 2 above. The cementitious mixture was prepared as in Example 4. All the injected material in both tanks were deposited at the same spot. Tank A material held a good vertical column with little slope movement and little down slope lobe development. The pile in Tank B did not maintain its integrity.

EXAMPLE 6

A nozzle was constructed using 0.75 inch schedule 5 pipe inside a 1.0 inch schedule 10 pipe creating an outer delivery annulus approximately 0.24 inch wide around an inner delivery tube approximately 0.75 inch in diameter. The annulus was connected to an air-driven peristaltic type pump, and the inner delivery tube to a progressive cavity type pump. Two open top vessels 1 ft deep by 6 ft in diameter were filled with ordinary tap water. A cementitious mixture consisting of 1 part Portland cement, 3 parts fly ash, 1.97 parts water was pumped at the rate of 1 gallon per minute (gpm) through the inner delivery tube into one of the vessels. Full strength silicate solution described in Example 1 was pumped into the second vessel at a rate of 0.15 gpm through the outer delivery annulus and at the same time the same cementitious mixture that was pumped into the first vessel was delivered through the center delivery tube. The angle of repose and the integrity of the two piles was observed: without silicate 20°-39°; with silicate 50°-59°. The pile in the vessel with silicate maintained its integrity better.

EXAMPLE 7

The conditions of Example 6 were repeated except the cementitious mixture was compounded with 2.15 parts water. The angle of repose for the pile without silicate was 40°-50°; the angle of repose with silicate was 50°-60°. The integrity of the pile in the vessel with silicate was better.

EXAMPLE 8

Standard 55-gallon drums and the delivery nozzle of Example 6 were used. The cementitious mixture of Example 6 was compounded with a 9:1 ratio of fly ash to cement. Similar results were observed.

EXAMPLE 9

Standard 55-gallon drums and the delivery nozzle of Example 6 were used. The cementitious mixture of Example 7 was compounded with a 9:1 ratio of fly ash to cement. Similar results were observed.

EXAMPLE 10

Standard 55-gallon drums and the delivery nozzle of Example 6 were used. The cementitious mixture of Example 6 was used and the pumping rate of the silicate was varied to give a final pumped ratio of silicate to cementitious mixture of 1:3. Similar results were observed.

EXAMPLE 11

Standard 55-gallon drums and the delivery nozzle of Example 6 were used. The cementitious mixture of Example 7 was used and the pumping rate of the silicate was varied to give a final pumped ratio of silicate to cementitious mixture of 1:7. Similar results were observed.

EXAMPLE 12

An open top vessel 4 ft deep and 20 ft in diameter was filled to a 3½ ft depth with ordinary tap water. A delivery nozzle was constructed with an inner pipe having an inner diameter of 1.5 inches and an outer pipe having an inner diameter of 1.939 inches resulting in an annular gap of 0.0195 inches. A cementitious mixture containing 209 lbs of water, 450 lbs of fly ash, 94 lbs of Portland Type II cement meeting the standard chemical requirements of ASTM C150 II, was used, resulting in fly ash to cement to water ratio by volume of 6.1:3.34 and 72% solids. The nozzle was placed approximately six inches below the surface of the water in the vessel and three ft above the floor of the vessel. The cementitious mixture was pumped by a four-inch peristaltic pump through the inner pipe of the constructed nozzle at 8.7 gpm. The water became cloudy immediately and remained so throughout the 2 hours and 20 minutes it took to pump the cementitious mixture. Probing the pile during delivery of the mixture indicated a soft mass with a gentle slope up towards the nozzle's location. The vessel was pumped out after two days. The material was approximately 18 inches high with an average angle of repose of 5°. Theoretical calculations based on the equations of a cone and the reported height was 8.3°. A two-foot diameter cylinder at the center of the pile was the only solidified material observed; the rest of the material was muddy with striations in color indicating the separation of the cement and fly ash. A 1 ft×1 ft×1½ft block was cut from the center of this solidified section. Two-inch cubes were prepared from this block and ASTM compressive tests performed on these cubes. Compressive strength reached 408 psi in 28 days. This was used for a control and comparison for several tests which were performed. The vessel was again prepared as above.

A sodium silicate solution, ratio $SiO_2:Na_2O=3.22$ and solids content of 37.6%, was pumped through the annular ring of the nozzle similarly placed by a spur gear pump. At the same time the above cementitious mixture was pumped through the inner pipe. The cementitious mixture to silicate ratio was 7.9:1 by volume. The water remained clear during the pumping. The pumping was terminated after 2 hours and 10 minutes when the top of the pile broke through the surface of the water: 5.7 cubic yards of the cementitious mixture had been used. The pile thus formed was able to support a man's weight (approximately 150 lbs) immediately after being formed and the water cleared. The vessel was again pumped out after two days. No striations were observed. The pile was a frustum 40 inches high with a 12-inch roof and a base 11 ft 8 inches in diameter which sat on a level "floor" of 8 inches. Penetrometer readings of 70+psi were obtained over the inner 16-ft diameter of the overall 21-ft diameter of the pile. The average angle of repose was 33° with a fairly concave slope surface. Theoretical calculation based on a cone was 28.4°. Compressive tests were performed on cubes prepared as above. Compressive strength reached 667 psi after 28 days.

EXAMPLE 13

The cementitious mixture, silicate solution, nozzle and pumps described in Example 12 were used. The open top vessel was the same dimensions and filled similarly except that the floor of solid grout formed in Example 12 was left in place. A higher flow rate (11.6 gpm) was used for the cementitous mixture so that the mixture to silicate ratio was 9.2:1 by volume. Pumping was terminated after 1 hour and 50 minutes. The pumping rates were capable of producing a pile at 4 cubic yards per hour. The pile was firm and the measured average angle of repose was 50°. Theoretical calculations gave a value of 25.7°. Compressive tests performed on cubes prepared as in Example 12 resulted in 842 psi after 28 days.

EXAMPLE 14

The cementitious mixture, silicate solution, pumps, nozzle and open top vessel described in Example 12 were used. A 6-inch layer of previously-formed grout was on the floor of the vessel when it was filled with ordinary tap water. The nozzle was placed approximately 12 inches above the vessel floor and approximately 20 inches below the surface of the water. The silicate flow rate was increased so that the cementitious mixture to silicate solution ratio was 6.9:1 by volume. The flow rate of the cementitious mixture was 11.6 gpm. Pumping was commenced, and when the nozzle was buried 18 inches in the pile the nozzle was raised 12 inches. When it was again buried in a second 18 inches of pile the pumping was terminated. This method produced a significantly broader roof. Burying the nozzle pushed out the sides and top of the building pile like a volcano. The produced frustum had the following dimensions: roof 3 ft, level base 8 inches, height above level base 43 inches, diameter at the base 12 ft. The measured average angle of repose was 39°. The compressive strength determined on cubes prepared similarly to Example 12 was 558 psi after 28 days.

EXAMPLE 15

The initial conditions of Example 14 were duplicated except the flow rate of the cementitious mixture was 13.1 gpm. The test proceeded as in Example 14. When the pile was within a few inches of the surface of the water, a 4 ft×8 ft piece of plywood was held over the pile beneath the surface of the water. There was minimal resistance to the upward vertical flow forcing the stream of cementitious mixture and silicate sidewards. A pile with a 4-ft roof contact was built. Pumping was terminated when the roof contact reached the edge of the plywood. The resulting shape of the pile was a double frustum. The upper frustum had a roof of 4 ft, a height of 3 ft, a base of 6 ft and an angle of repose of 45°; the lower frustum had a roof (the base of the upper frustum) of 6 ft, a height of 1 ft, a base of 12 ft and an angle of repose of 18°. The overall height of the pile was 4 ft. Compressive strength determined on cubes prepared as in Example 12 was 713 psi after 28 days.

EXAMPLE 16

Example 14 was repeated except that the pH of the water in was reduced to approximately 2.7 with sulfuric acid (95% wt/wt). The measured average angle of repose of the resulting pile was 35°; the theoretically calculated angle was 28.4°. Compressive strength of the cubes prepared similarly to Example 12 was 787 psi after 28 days.

EXAMPLE 17

The open top vessel, cementitious mixture, silicate solution and nozzle described in Example 12 were used. Silicate solution was pumped at 1.7 gpm; the cementitious mixture was pumped at 11.6 gpm. Six to eight inches of dried grout formed the floor of the vessel. The vessel was not filled with water. The nozzle was suspended 3 inches above the floor of the pool. The initial angle of repose was 42°. The material would travel 2–4 inches before setting up sufficiently to stop flow. This was typical of the observations made with the presence of water; however, in this case, the observations were easier.

We claim:

1. A method of formless casting of a cementitious mixture in a body of water, comprising:
   a. adding an alkali metal silicate solution to said body of water so that dilute silicate solution is formed in at least a portion of said body of water;
   b. placing an aqueous slurry of a cementitious mixture in that portion of said body of water that consists of said dilute silicate solution; and
   c. allowing the cementitious mixture to set thereby providing the desired underwater structure; said alkali metal silicate having 1.6 to 4.0 moles of $SiO_2$ for each mole of $M_2O$, wherein M is sodium, potassium or mixtures thereof, and sufficient silicate being added to the body of water so that the cementitious mixture is self-supporting upon pouring, said cementitious mixture containing Portland cement.

2. The method of claim 1 wherein the alkali metal silicate is sodium silicate that contains 2.5 to 4.0 moles of $SiO_2$ per mole of $Na_2O$, the dilute silicate solution portion of the body of water contains about 0.5 to about 3.0% wt/wt of silicate solids and the cementitious mixture slurry contains 0.2 to 1 pbw of water for each pbw of cementitious mixture.

3. A method of formless casting of a cementitious mixture in a body of water comprising:
   a. providing a flow of said slurry of a cementitious mixture into said body of water, said cementitious mixture containing Portland cement, and said slurry containing 0.2 to [0] 1 pbw of water for each pbw of cementitious mixtures;
   b. simultaneously providing a flow of alkali metal silicate that surrounds the flow of cementitious mixture into said body of water, said alkali metal silicate solution having 1.6 to 4.0 moles of $SiO_2$ per mole of $M_2O$ wherein M is sodium, potassium or mixtures thereof and contains 25 to 35% wt/wt of $SiO_2$;
   c. continuing the flows of the cementitious mixture and alkali metal silicate until the desired structure is formed; and
   d. allowing the cementitious mixture to set; the amounts of the slurry of the cementitious mixture and silicate solution being such that upon being formed the cementitious mixture forms a self-supporting structure.

4. The method of claim 3 wherein the alkali metal silicate is sodium silicate that contains 2.5 to 4.0 moles of $SiO_2$ per mole of $Na_2O$ and there being 2.5 to 15 parts by volume (pbv) of cementitious mixture for each pbv of silicate solution.

5. The method of claim 4 wherein there is 3 to 10 pbv of cementitious mixture for each pbv of silicate solution.

6. The method of claim 4 wherein the Portland cement is Type of Type II and the cementitious mixture contains fly ash.

7. The method of claim 5 wherein the Portland cement is Type or Type II and the cementitious mixture contains fly ash.

* * * * *